March 10, 1953　　　F. A. RAMSDELL　　　2,630,737
APPARATUS FOR MAKING FILM EXPOSURES FOR
THREE-DIMENSIONAL MOVING PICTURES
Filed June 25, 1949　　　　　　　　　3 Sheets-Sheet 1
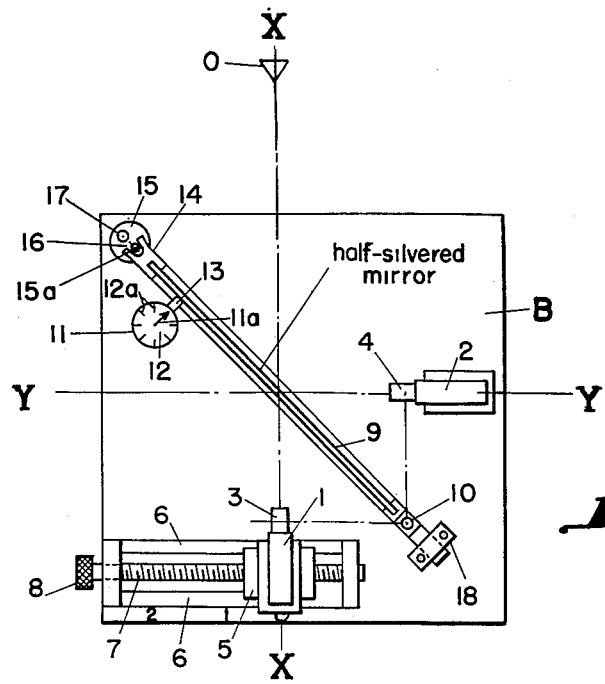
*Fig.1.*
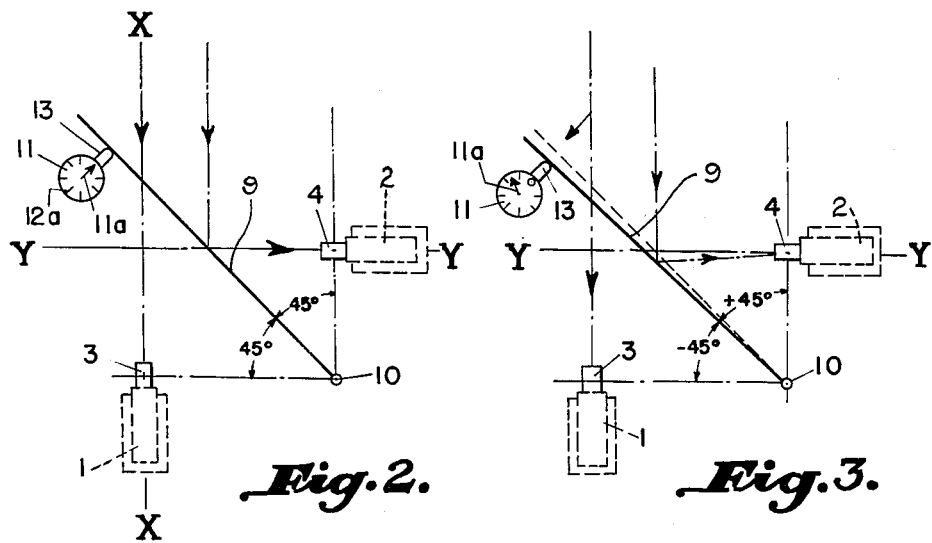
*Fig.2.*　　　*Fig.3.*
INVENTOR.
FLOYD A. RAMSDELL
BY Owen W. Kennedy
Attorney March 10, 1953  F. A. RAMSDELL  2,630,737
APPARATUS FOR MAKING FILM EXPOSURES FOR
THREE-DIMENSIONAL MOVING PICTURES
Filed June 25, 1949  3 Sheets—Sheet 2
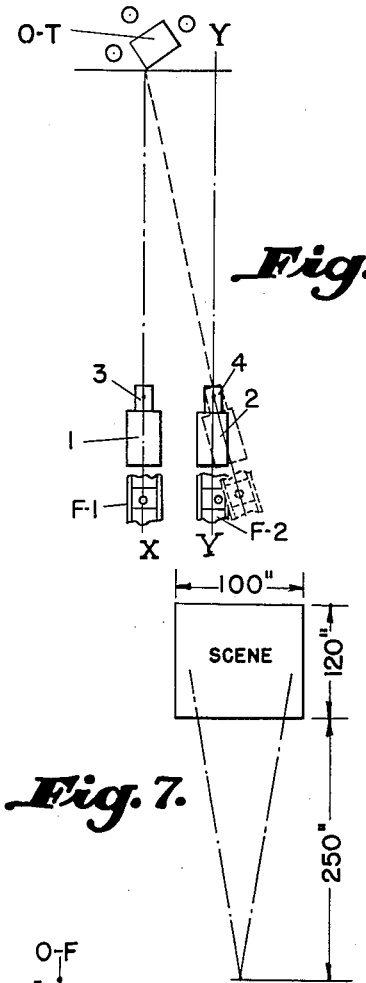
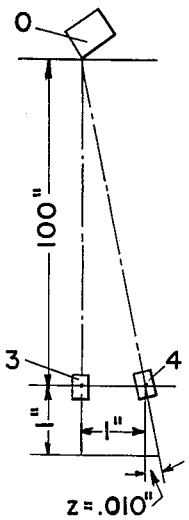
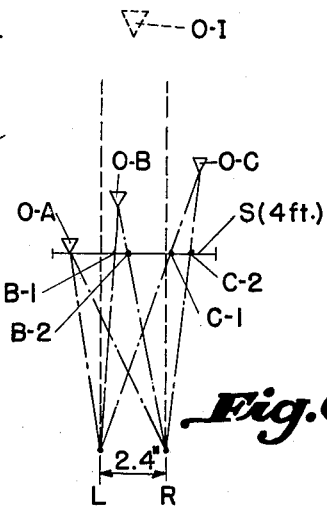
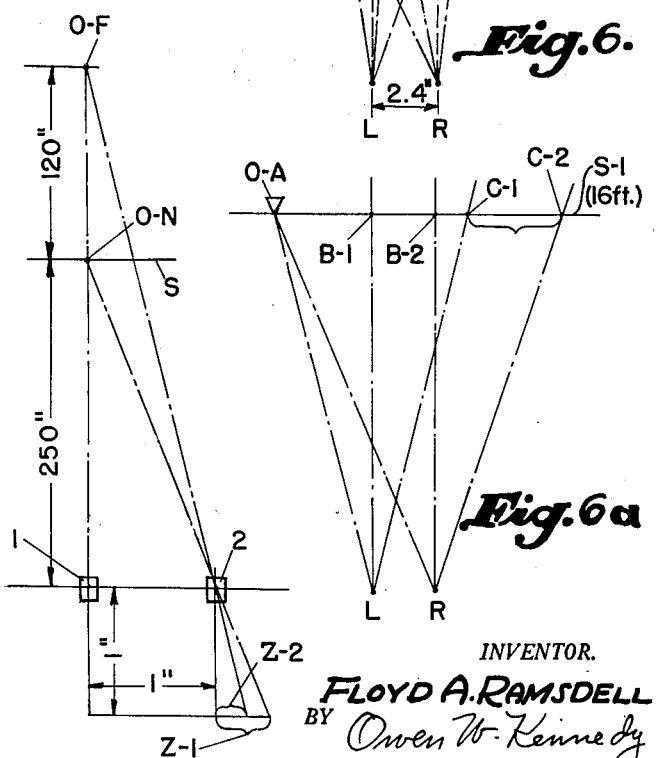
INVENTOR.
FLOYD A. RAMSDELL
BY Owen W. Kennedy
Attorney March 10, 1953  F. A. RAMSDELL  2,630,737
APPARATUS FOR MAKING FILM EXPOSURES FOR
THREE-DIMENSIONAL MOVING PICTURES Filed June 25, 1949  3 Sheets-Sheet 3

1.2 interlens
z=.0050"

.480" interlens
z=.0040"

.200" interlens
z=.0027"

INVENTOR.
FLOYD A. RAMSDELL
BY Owen W. Kennedy
Attorney

Patented Mar. 10, 1953

2,630,737

UNITED STATES PATENT OFFICE 2,630,737

APPARATUS FOR MAKING FILM EXPOSURES FOR THREE-DIMENSIONAL MOVING PICTURES

Floyd A. Ramsdell, Worcester, Mass., assignor to Worcester Film Corporation, Worcester, Mass., a corporation of Massachusetts Application June 25, 1949, Serial No. 101,326

4 Claims. (Cl. 88—16.6)

The present invention relates to an improved apparatus for making photographic exposures of a given subject on moving picture films, in such a manner that the resulting film images can be continuously projected into overlying relation onto a screen, so as to obtain a three-dimensional effect, with the assurance that the subject will always be properly located in the different scenes of the action that is being portrayed.

It is well known that if two cameras are placed side by side with their optical axes displaced a distance approximating the so-called interocular distance between the human eyes, the resulting images recorded on the films will substantially reproduce what each eye actually sees. Then, if these film images be simultaneously projected in overlying relation on a screen and viewed, in conjunction with suitable light polarizing devices, a three-dimensional effect will be obtained, and a person viewing the screen images receives the illusion of looking through a window at solid objects, with the plane of the screen itself corresponding to a window opening. In the making of photographic exposures to obtain a three-dimensional effect for projection as still pictures, the problem involved is not difficult, provided the projected film images on the screen are of substantially the same size as the subject that was photographed, and that the film images are properly framed to center the subject on the screen.

However, when it is desired to produce three-dimensional moving pictures, the problem becomes extremely complex, due to a number of variable factors, hereinafter discussed in detail, such as the size of the projection screen, the average distance between the screen and the audience, the ratio between film and screen image areas, and the different distances from the cameras being used to near and far objects in the scene being photographed. When producing films for projection as continuous motion pictures, in which close-up and distant shots are run successively, the factors noted above vary with each shot, and as will be hereinafter pointed out, the cameras being used must have the correct interlens separation that will meet the requirements of each set and type of action being filmed. Furthermore, some provision must be made for accurately locating the film images of the near object being photographed, so that when projected, this near object will be at a previously chosen point, such as at the screen, irrespective of whether the scene is a long shot, medium shot, or close-up.

The object of the present invention is to provide an improved apparatus for making photographic exposures on the films of moving picture cameras in such a manner that subsequent projection and viewing of the film images, in association with light polarizing devices, will result in the audience seeing all of the projected screen images with the desired three-dimensional effect consistent with the scene or action being shown. Briefly stated, the present invention resides in providing a pair of motion picture cameras mounted in such manner as to readily obtain any desired interlens separation therebetween, corresponding to an exact mathematical determination of such separation to meet the requirements of a given problem, as presented by the above-noted variable factors that enter into each particular scene of the action being photographed by the cameras, with added provision for properly locating the film images of the subject shown in each scene.

The above and other advantageous features of the invention will hereinafter more fully appear from the following description considered in connection with the accompanying drawings, in which—

Fig. 1 is a plan view of an arrangement of apparatus for carrying out the invention.

Figs. 2 and 3 are diagrams based on the arrangement of apparatus in Fig. 1, and showing the results obtained through determination of the proper interlens separation for a given subject being photographed, as well as to obtain proper location of the respective film images of this subject.

Figs. 4 and 5 are diagrams illustrating certain principles involved in three-dimensional photography, which principles enter into the computation of the interlens separation between cameras and the location of film images, in accordance with the present invention.

Figs. 6 and 6a are diagrams illustrating certain underlying problems that are encountered in projecting three-dimensional pictures on a screen.

Figs. 7, 8 and 9 are diagrams illustrating the factors entering into mathematical computations of the interlens separation and film image location, required for properly photographing a given scene in accordance with the present invention.

Figures 10, 11, 12:
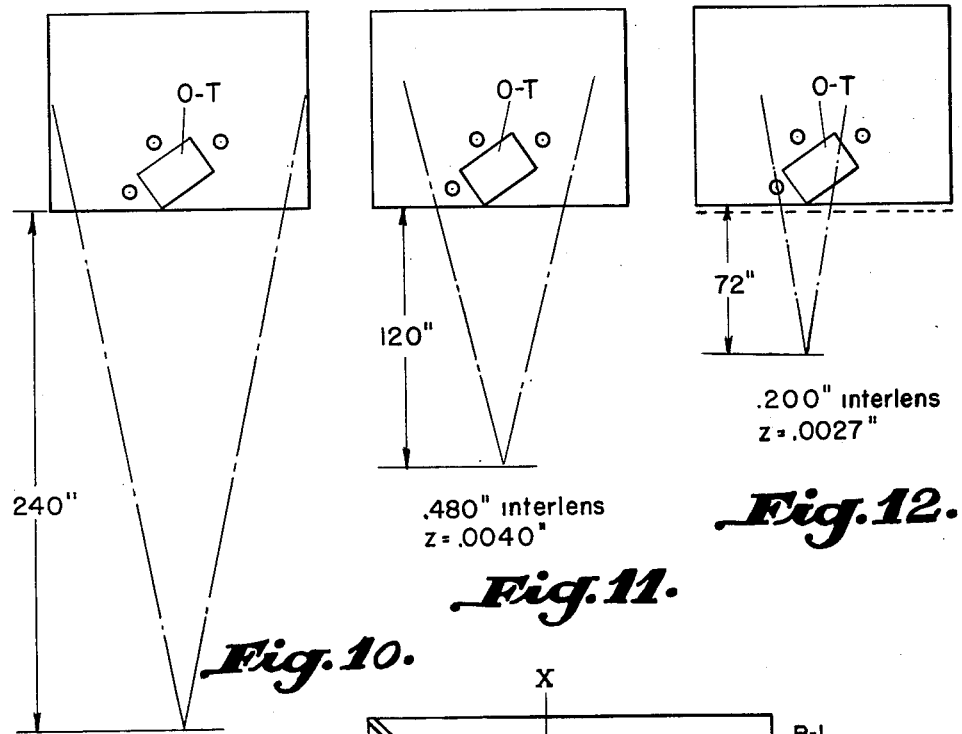
Figs. 10, 11 and 12 are diagrams illustrating the importance of accurate determination and control of interlens separation and film image location, when photographing a given scene as a long, medium or close-up shot by the cameras.

Referring first to Fig. 1, the invention is shown, for purposes of illustration, as being embodied in apparatus for making film exposures for three-dimensional pictures by means of moving picture cameras 1 and 2 mounted on a base B, with the axes X—X and Y—Y of the respective camera lenses 3 and 4 arranged at right angles to each other. The camera 1 is adapted to be shifted bodily on the base B by means of a carriage 5 cooperating with a horizontal slide 6, with a screw shaft 7 cooperating with the carriage 5, so that turning the shaft by means of a knob 8 will shift the camera 1 on the base B. The camera 2 is fixed on the base B and, as will hereinafter appear, the purpose of shifting the camera 1 with respect to the camera 2, is to obtain any desired separation between the camera lens axes X—X and Y—Y, while still maintaining the right angle relation between the axes.

In order that the cameras 1 and 2 may be utilized to simultaneously photograph a subject, so that projected film images will give a three-dimensional effect when viewed on a screen in association with light polarizing devices, a mirror 9 is mounted on the base B between the cameras 1 and 2. The mirror is turnable on a pivot 10, for a purpose which will later appear, and with the parts occupying the position of Fig. 1, the mirror 9 is shown as bisecting the right angle between the cameras lens axes X—X and Y—Y. The mirror 9 is of the particular type commercially known as a "half-silvered pellicle mirror" which has the well-known characteristics of passing, as well as reflecting, light.

Therefore, when an illuminated object O is placed along the optical axis X—X of the camera 1, a film in this camera will directly record an image of the object, as a result of light rays passing through the mirror 9. As regards the other camera 2, rays of light reflected by the mirror 9, with respect to the camera axis Y—Y, will result in recording an image on the film in camera 2 that will be identical with the image photographed by the camera 1, due to the fact that the mirror 9 passes and reflects light in equal proportions. The statement that the images photographed by the cameras 1 and 2 will be identical, is based on the showing of the apparatus in Fig. 1, wherein the position of the mirror 9 is such that it bisects the 90° angle between the camera lens axes X—X and Y—Y, and the axes are at equal distances from the pivot 10 of the mirror 9.

If it now be assumed that it is desired to produce film images in the cameras 1 and 2 for the projection of three-dimensional pictures on a screen of predetermined size, it is obvious that the apparatus of Fig. 1 must be adjusted to obtain a result comparable to an interlens separation suitable for the conditions of the object O being photographed, particularly as regards the location of this object with relation to the plane of the projection screen which, as previously indicated, corresponds to a window opening through which the object is to be seen in depth by the audience. As previously pointed out, the camera 1 is adapted to be shifted with respect to the camera 2, so as to move its axis X—X farther away from the pivot 10 than is the axis Y—Y of the fixed camera 2. This has the same effect as though the axes were parallel and had a separation such that the film images taken by the cameras 1 and 2 will no longer be identical, but will correspond generally to how the object O would be seen by the left and right eyes. This condition is indicated in Fig. 2, wherein the mirror 9 makes an angle of 45° with the axes X—X and Y—Y. If now the mirror 9 be swung about its pivot 10, then the light rays reflected by the mirror 9 to the camera 2 will be deflected, as indicated in Fig. 3, so that the film images taken by camera 2 will be properly located on the camera film, as later described in detail, with deflection of light rays to the camera 2 being dependent upon the degree of turning the mirror 9 from its initial setting, wherein it bisects the angle between the optical axes X—X and Y—Y.

The net result of swinging the mirror 9 about its pivot is substantially the same as if the cameras 1 and 2 were placed side by side, and then the camera 2 rotated about the center of its lens 4 to obtain a convergence of the camera lens axes upon the object O being photographed, to simulate the condition wherein the optical axes of the eyes of a person viewing an object, will converge upon that object, so that the object is seen in depth, due to the interocular displacement between the axes of the human eyes. In other words, swinging of the mirror 9 about its pivot 10 results in locating the image of the object O on the film in camera 2 in exactly the same manner as if camera 2 were placed beside camera 1 with the proper interlens separation, and then turned on the center of its lens to properly locate the image on the film with respect to its distance from the edge of the film.

In order that the above described locating of the film images in camera 2 may be accurately controlled, in accordance with the mathematical computations hereinafter described, the mirror 9 has associated therewith a dial indicator 11 which is adapted to graphically show the results of swinging the mirror 9 about its pivot 10 from the initial position of Fig. 1, which corresponds to an initial relation between the camera lens axes X—X and Y—Y, wherein the effective interlens separation is zero, and the mirror 9 bisects the angle between axes X—X and Y—Y.

The importance of very accurate control of interlens separation in the cameras used to take a depth scene can best be shown by reference to the diagrams of Figs. 6 and 6a, and the following discussion of the principles involved will assist in an understanding of the objectives attained through use of the apparatus previously described with reference to Fig. 1. In Fig. 6, it is assumed that a person with eyes separated by the normal interocular distance of 2.4" is seated in front of a 4 ft. screen S on which a depth picture is being projected. Object O—A is at the screen, while objects O—B and O—C are behind the screen.

With the conditions shown in Fig. 6, rays of light from both eyes to object O—A intercept at the screen, whereas rays of light to the objects O—B and O—C intercept the screen at the separated points B-1, B-2 and C-1, C-2. Obviously, the separation between these points on the screen determines the relative locations of the objects O—B and O—C in the scene, with the object that is farthest back from the screen having the greatest separation between the points of screen interception. Stated another way, the distances B-1, B-2 and C-1, C-2 are a measure of the distance the objects O—B and O—C seem to be in back of the screen plane.

It is also apparent from a consideration of Fig. 6, that the distances B-1, B-2 and C-1, C-2 are less than the normal interocular distance of 2.4", so that the eyes, in viewing the scene, actually converge slightly in looking at these objects. In the case of an object O—I at infinity, as indicated in dotted lines in Fig. 6, the separation at the screen of the rays of light going to this object is only 2.4", and even in this extreme condition, the separation on the screen between the points of interception represented by the dotted lines, permits the eyes to look straight ahead.

It is a well-known fact that while the human eyes can converge, or toe in, or can look straight ahead in viewing a depth scene as discussed above with reference to Fig. 6, the eyes cannot diverge, or toe out, without serious eye strain. This basic physical limitation in the functioning of the human eyes must always be taken into consideration when making three-dimensional moving pictures, and the diagram of Fig. 6a demonstrates the absolute necessity of accurate determination of the proper interlens separation for each scene being photographed. In Fig. 6a, it is assumed that the same scene shown in Fig. 6 is being viewed on a 16 ft. screen S-1, instead of a 4 ft. screen, by a person with eyes separated the normal interocular distance of 2.4". With this condition, the separation on the 16 ft. screen S-1 between the points B-1, B-2 and C-1, C-2 is four times the separation of these same points on the 4 ft. screen. As a result, the distance between points B-1 and B-2 substantially corresponds to normal interocular distance, so as to place the objects O—B at infinity, while the distance between points C-1 and C-2 becomes so much greater than the normal interocular distance that the scene cannot be viewed without serious eye disturbance, due to the fact that the eyes must diverge in attempting to look at object O—C.

From the foregoing, it is apparent, then, that as the size of the screen on which film images are to be projected increases, the interlens separation of the cameras used to photograph the scene must be correspondingly reduced, for in no case can the separation on the screen of left and right eye images of a given object be greater than 2.4".

Having demonstrated the absolute necessity for a precise mathematical calculation to determine correct interlens separation for each scene being photographed, there will next be discussed the further necessity for properly locating the film images taken by the cameras 1 and 2, whereby the film images of any object that is intended to be at the screen will be of the same distances from the edges of the respective films, so that they will coincide when projected on the screen.

The necessity for proper location of the film images and the manner in which such proper location is obtained through adjustment of the mirror 9, is demonstrated in the diagrammatic showing of Fig. 4. Here, a scene is shown as being photographed by cameras 1 and 2, which scene includes an object O—T, such as a table, having a number of other objects grouped around it, with one corner of the table intended to be at the screen. Therefore, in order for the corner of the table to appear at the screen when the film images made by cameras 1 and 2 are projected, the corner of the table in these film images, as produced by the left and right eye cameras, must be at the same distance from the edge of each film. Otherwise, left and right eye film images of the object O—T, as represented by the table, would not appear in overlying relation on the screen.

Let it now be assumed that the cameras 1 and 2 are placed in side-by-side relation with the proper interlens separation, with the axis X—X of the left eye camera 1 in line with the near corner of the table T which is to be at the screen. Then, if the image of the table corner lies in the center of the film F-1 of left eye camera 1, the film image of the same point of the right eye camera 2 will be at the right of the center of the film F-2 of camera 2. Therefore, if the scene is photographed with the camera axes X—X and Y—Y in parallel relation with a predetermined interlens separation, the film images of the corner of the table at the screen will be at different distances from the edges of the respective films F-1 and F-2 and the projected film images of the corner of the table will not superimpose on the screen.

Assuming that it would be possible to mount the cameras 1 and 2 in side by side relation with an interlens separation of one inch or less, a condition practically impossible of attainment with commercial moving picture cameras, it would also be possible to locate the image of the near corner of object O—T at the center of the film F-2 in the right-hand camera 2 by rotating this camera about the center of its lens 4. Such rotation is indicated in dotted lines in Fig. 4 which shows a ray of light from the near corner of the table passing through the center of the film F-2 of the right-hand camera 2, so that the film image of this corner, which is to be at the screen, is at the same distance from the edge of film F-2 as is the film image of the same corner from the edge of the film F-1 of camera 1.

Referring now to the diagram of Fig. 5, which is not to scale, it follows that if the object O—T is assumed to be 100" distant from the cameras 1 and 2, and that the camera axes X—X and Y—Y are 1" apart, the amount that the right-hand camera 2 would have to be rotated, so that the line from the corner of the table to the center of the line 4 will pass through the center of the film F-2, will be represented by the distance z, as measured at a distance of 1" from the center of lens 4. Since the triangles thus formed on the diagram of Fig. 5 are similar, it follows from the values applied to similar sides of the two triangles of Fig. 5, that z will equal .010", measured 1" from the center of the lens 4 of camera 2.

If it next be assumed that the centered film images taken by the cameras 1 and 2, after the camera 2 has been rotated, are projected so that the two table corner images superimpose on the screen, then all other objects appearing in the scene will have their proper relationship to the superimposed images of the properly located main object O—T, with the desired three-dimensional effect. Therefore, if several scenes involving object O—T were photographed in succession with the same interlens separation, but with varying distances between the cameras 1 and 2 and the object, it is evident that the degree of rotation of the camera 2 must be changed to correspond with each change in distance between the cameras and the object, as would occur in photographing close-up, medium and long shots.

Referring again to Fig. 1, it is obvious that with the arrangement of the present invention, the cameras 1 and 2 are not in side by side relation, but are mounted at right angles to each other on the base B, with the left-hand, or left eye, camera 1 photographing the object O—T directly through the semitransparent mirror 9, while the right-hand, or right eye, camera 2 photographs the reflection of the same object in the mirror. As previously pointed out, the camera 1 is movable along the screw shaft 7 in a direction parallel to the lens axis Y—Y of the fixed camera 2 by turning the knob 8, so it is possible, by manipulation of the knob 8, to obtain the effect of any desired interlens separation between the axes X—X and Y—Y from zero up to the normal interocular separation of 2.4".

The correct interlens separation for any particular scene being photographed is computed by a calculation hereinafter discussed in detail, and while the computed interlens separation will seldom, if ever, exceed the normal interocular separation of 2.4", for the reasons previously pointed out, experience has shown that the photographing of close-up scenes for motion picture projection will require an interlens separation which is usually less than 1" and possibly as small as .250". Therefore, the mounting of the cameras 1 and 2 at right angles to each other, with the mirror 9 therebetween, so as to simultaneously produce direct and reflected film images, makes it possible to employ computed interlens separations that are so small as to be physically impossible of attainment were the cameras to be mounted in side by side relation, with the actual width of the cameras determining the minimum interlens separation that could be obtained.

In the light of the foregoing discussion concerning the necessity of properly locating the object being photographed on each camera film, when the camera 1 is moved to obtain a computed interlens separation, it is obvious that turning the mirror 9 about its pivot 10 will accomplish the desired locating of the object just as effectively as by rotating the camera 2 about the center of its lens 4. The only difference between the actual fixed mounting of the camera 2, with relation to the angularly adjustable mirror 9, as shown in Fig. 1, and the theoretical pivotal mounting of the camera 2, as indicated in Fig. 4, resides in the fact that pivotal movement of the mirror 9 doubles the movement of the reflected image of the object on the film F-1 of camera 2, as will be evident from a consideration of Fig. 3. Therefore, it is necessary to move the mirror 9 only one-half of the distance through which the camera 2 would have to be rotated as measured 1" from the center of lens 4, on the basis of the above described computation of the distance $z$ at the base of the small triangle in Fig. 5.

In the arrangement of Fig. 1, the dial indicator 11 is shown, for purposes of illustration, as being placed 5" from the pivot 10 of the mirror 9, so that in using the indicator 11, it is necessary to move the mirror 9 five halves of the computed amount of camera rotation per inch, or stated another way, two and one-half times the value of $z$, as determined in solving any particular problem in accordance with the principles previously discussed. For this reason, the indicator 11 provides a card 12 having suitable markings 12a for reading in connection with the indicator pointer 11a, with each unit of the markings 12a on the card 12 representing an actual movement by the mirror 9 of .0025", at its point of contact with the plunger 13 of the indicator 11, 5" from the mirror pivot 10.

When it comes to applying the above described relation between the mirror 9 and its dial indicator 11 to interpret the solution of a particular problem, the mirorr 9 is moved until the pointer 11a of the indicator coincides with the particular marking 12a on the card 12 most closely corresponding to the figure arrived at by the solution of the problem, all as will hereinafter appear from the illustrative computation.

In order to accurately position the mirror in accordance with the solution of a given problem, the mirror 9 is mounted in a holder 14 turnable about the pivot 10 in any suitable manner, as by means of an eccentric cam 15 carrying a pin 15a, cooperating with a slot 16 at the free end of the holder 14. The cam 15 provides a knob 17 by which it may be turned to swing the mirror 9 just enough to cause the indicator plunger 13 to move the pointer 11a to the desired marking 12a on the card 12. After the mirror 9 has been set, it is locked in position by means of a suitable clamp 18 cooperating with the holder 14 adjacent to the pivot 10.

As previously pointed out, a computation of the interlens separation between cameras 1 and 2 and the adjustment of the mirror 9 to obtain proper location of film images, is carried out before taking each scene, and each such computation is made so as to take into consideration all of the variable factors entering into each scene. Generally speaking, the variable factors involved are screen size, average viewing distance between members of the audience and the screen, ratio of film image size to screen size, and distances from camera to far and near objects, and the following computation takes into consideration all of these factors.

Having previously demonstrated the relative difference that must exist between any given pair of film images for projection in overlying relation on a screen to create a three-dimensional effect, it must always be borne in mind that these projected pairs of film images will be viewed by eyes which are approximately 2.4" apart. Therefore, in approaching the problem of finding a working basis for computing the proper interlens separation for the cameras 1 and 2, it can be assumed that the separation between the left lens image of the farthest point and the right lens image of this same point on the screen must never exceed the normal eye separation of 2.4", for otherwise, the eyes of an observer would have to diverge. It must also be borne in mind, when approaching the problem of how best to photograph a given scene, that the size of the projection screen to be used for viewing by the audience is an important factor which must enter into the proposed calculation of interlens separation. It is evident from a comparison between Figs. 6 and 6a that the separation between points B-1 and B-2 will be greater if projected on a 16 ft. screen than on a 4 ft. screen, and since the separation of these same points determines the distance which the object O—B will appear back of the screen S, it follows that the greater the blow-up of the film image on the screen, the greater will be the apparent depth seen by a person in the audience.

It will be further apparent from a consideration of Figs. 6 and 6a that the separation of the points B-1 and B-2 is affected by the actual separation between the two camera lenses at the time the scene is photographed. As a result, the major problems involved in three-dimensional photography for motion picture projection are first, the mathematical determination of the correct interlens separation required by the particular problem and the ability to accurately set the cameras for this separation and second, the ability to accurately locate film images, so that when projected in overlying relation, they will give the correct illusion of depth. Since the average audience viewing distance and the size of the projection screen can be definitely determined in advance of photographing any scene, it will be assumed in the following solution of a given problem to illustrate the computation, that it is desired to photograph a scene 100" wide and 120" deep, and that the camera will be 250" from the near object that is to be at the screen when the scene is projected from the film images, all as indicated diagrammatically in Fig. 7.

Let it also be assumed that this same scene, when photographed, is to be projected on a screen 200" wide, so that the 100" wide scene is to be blown-up to a width of 200", or twice its actual width. This blow-up refers to all dimensions, so the actual depth of 120" must appear to be 240" to a person sitting at the average audience viewing distance which is assumed to be around 500", or in the neighborhood of 40 ft.

The problem next involves the determination of what will be the separation on a screen 200" wide of the left eye and right eye images of a far object, as viewed by a person with eyes 2.4" apart seated 500" from the screen, so that the object will seem to be 240" back of that screen, with the near object being at the screen. To simplify the problem, let it be assumed that near object and far object and left eye are in the same straight line, and that the line of sight of the right eye forms the hypotenuse of a right triangle, as shown in Fig. 8, in which L—E is left eye.
R—E is right eye.
O—F is far object.
O—N is near object, and
Z is the separation on the screen S—I between left eye and right eye images of far object.

Since the triangles of Fig. 8 are similar, $$\frac{240}{Z} = \frac{740}{2.4}; Z = \frac{240 \times 2.4}{740}$$

and $$Z = .77''$$

Since blow-up from a 16 mm. film having a .400" wide useable film area width to a 200" screen is 500 times, the separation of the images on the actual film is $$\frac{.770''}{500} \text{ or } .00154''.$$

Having determined the separation of the film images, the next step in the solution of the problem involves the determination of what separation between lens axes of the cameras 1 and 2 will produce the above indicated result. In the following discussion of this next step, reference will be had to Fig. 9 wherein O—F and O—N are the far and near objects, and it is assumed that the left eye and right eye cameras 1 and 2 are 1" apart and that 1" lenses are used. Again applying the condition of similar triangles to the solution of the problem, wherein Z–1 represents the change in position of near object,
Z–2 represents the change in position of far object, and we have $$\frac{370}{1} = \frac{1}{Z-2} \text{ and } Z-2 = \frac{1}{370} = .0027$$

$$\frac{250}{1} = \frac{1}{Z-1} \text{ and } Z-1 = \frac{1}{250} = .0040$$

and $$Z-1 - Z-2 = .0040 - .0027 = .0013''$$

The difference between the values of Z–1 and Z–2, as given above, namely, .0013" is the separation on the film between left and right eye views of far object when cameras are spaced 1" apart, but as previously pointed out, the film images must have a separation of .00154", if the scene is to meet the requirements of the problem, as stated above, with reference to Figs. 7 and 8. By dividing the required separation of .00154 by the calculated separation of .0013, when camera lenses are 1" apart, it follows that the correct interlens separation between cameras 1 and 2 for photographing the scene having the above stated requirements is $$\frac{.00154 \text{ (separation required)}}{.0013 \text{ (separation at 1'')}} = 1.18''$$

Therefore, to take three-dimensional pictures of a scene 120" deep with 16 mm. cameras 250" from the near object, with the idea of projecting the film images on a screen 200 ft. wide, so that the scene will appear to be 240" deep to a person in the audience seated 500" from that screen, the cameras 1 and 2 must be positioned by turning the knob 8, so that the interlens separation between the cameras is 1.18".

As previously pointed out in connection with the discussion of Figs. 4 and 5, the movement of the mirror 9 about its pivot 10, for the purpose of properly locating the film images in camera 2 with reference to the edge of its film F–2, can also be determined with a precise mathematical calculation, when once the correct interlens separation has been calculated for a given scene in the manner set forth above. Applying the principles illustrated in the diagram of Fig. 5 to the solution of the present problem, wherein the camera 1 is located a distance of 250" from the near object with an interlens separation between the cameras of 1.18", it follows that $$\frac{250}{1.18} = \frac{1}{z}$$

$$z = \frac{1.18}{250}$$

and $$z = .0047''$$

The above calculated value of $z$, namely, .0047", represents the amount that the camera 2 would have to be rotated about its lens, with this distance being measured 1" from the lens center. However, as previously pointed out, the cameras 1 and 2 are not in side by side relation, but have their lens axes at right angles, and with the apparatus of Fig. 1, the above calculated amount of pivotal movement is replaced by turning of the mirror 9 to a degree to correspond with the calculated degree of rotation of the camera. Applying the above calculated value of $z$ to the present case, it follows that the mirror must be rotated by turning the knob 17 until its pointer 11a is brought to register with a marking 12a on the dial card 12 corresponding to the above calculated value of $z$, multiplied by two and one-half times, since, as previously pointed out, the dial plunger 13 is located 5" from the pivot 10, and the movement of the mirror 9 doubles the deflection of light rays, as indicated in Fig. 3.

Therefore, in order to properly locate film images taken by the camera 2 with an interlens separation of 1.18" to meet the conditions of the scene being photographed, as described above, with reference to Figs. 7, 8 and 9, the knob 17 is turned to swing the mirror 9 until its pointer 11a registers with a card reading of .01175, this figure being the result of multiplying .0047" by 2.5.

As previously pointed out, each unit of the markings 12a on the card 12 represents an actual movement by the mirror 9 of .0025", at its point of contact with the plunger 13 at a distance measured 5" from the mirror pivot 10. Therefore, by carefully turning the knob 17, while observing the card markings 12a, it is possible to bring the pointer 11a to a position on the card 12 substantially half-way between the fourth and fifth units, and exactly corresponding to the calculated mirror movement of .01175".

The importance of being able to control the pivotal movement of the mirror 9 in accordance with calculated mirror movements amounting to only a small fraction of an inch, as in the foregoing solution of a given problem, becomes more pronounced when the subject being photographed requires a calculated interlens separation of less than 1". Diagrammatic showings of the importance of accurate mirror control appear in Figs. 10, 11 and 12 which also illustrate the extreme variations in interlens separation that will be encountered when photographing a scene, such as a room with objects placed around a table, for successive long, medium and close-up shots.

Fig. 10 shows a long shot being photographed with a calculated interlens separation of 1.2", and in order that the forward edge of the table O—T shall be at the same distance from the edge of each camera film, the value of $z$ will be calculated in accordance with the computation illustrated by Fig. 5 for a given distance between the cameras and the table. If this distance be taken as 240" (20 ft.), then the calculated value of $z$ will be .0050" and this figure will be used in adjusting mirror 9.

In Fig. 11, the same scene is being photographed as a medium shot with a calculated interlens separation of .480", and obviously, the determination of the value $z$ will result in an even smaller figure, due to the decreased interlens separation, as compared to the conditions of Fig. 10. If the distance between cameras and corner of table is taken as 120" (10 ft.), then $z$ will be .0040", and obviously, the necessity for accurate control of the mirror movement becomes greater as the value of $z$ decreases.

A third condition is shown in Fig. 12 where only a portion of the table fills the screen, as in making a close-up shot, wherein the computed interlens separation may have a value as little as .200". Under these conditions, with the distance between cameras and table only 72" (6 ft.), the calculated value of $z$ becomes .0027 and is so small as to render accurate control of the mirror movement extremely critical, in order to make it possible to produce film images that will be properly located with respect to the edges of the respective films in cameras 1 and 2.

The ability of the apparatus of the present invention to accurately control mirror movement in accordance with careful calculations, renders it possible for the same cameras 1 and 2 to be used to photograph the scene of Fig. 12, so as to have the effect of placing the table slightly back of the screen, as indicated in dotted lines in Fig. 12. By shifting the mirror 9 very slightly, in accordance with calculations of the above described character, this result can be obtained without disturbing the interlens separation between the cameras.

In the foregoing discussion of the advantages of being able to accurately control movement of the mirror 9 about its pivot, it has been stated that turning of the mirror obtains the same results in locating film images of camera 2, as would be obtained by mounting the camera 2 to turn bodily about a pivot extending through the center of its lens 4, as indicated in dotted lines in Fig. 4. In other words, the particular arrangement of apparatus shown in Fig. 1 wherein the camera 2 is fixed, while the camera 1 is movable bodily, accompanied by pivotal mounting of the mirror 9, represents a particular embodiment of the invention that has been found to be best suited for practicing the principles underlying the present invention.

However, it is to be understood that the results of the foregoing calculations for accurate determination of interlens separation and film image location can be utilized with other forms of apparatus adapted to obtain the same general results. For example, the apparatus can be modified to the extent shown in Fig. 13 by making both cameras 1a and 2a movable and making the mirror 9a fixed, so as to make an angle of 45° with the axis X—X of camera 1a. In this modified arrangement, the camera 1a is mounted as in Fig. 1, while the camera 2a is mounted on a carrier 19 adapted to swing on a fixed pivot 20, the axis of which extends through the center of its lens. Suitable means, such as a worm gear 21 and worm gear 22, may be employed for controlling the degree of angular movement of the camera 2a about this pivot 20, in accordance with computed values of $z$ in Fig. 5, which values could be used in determining the position of the camera 2a for a given angular movement measured 1" from its pivot 20.

Figure 13:
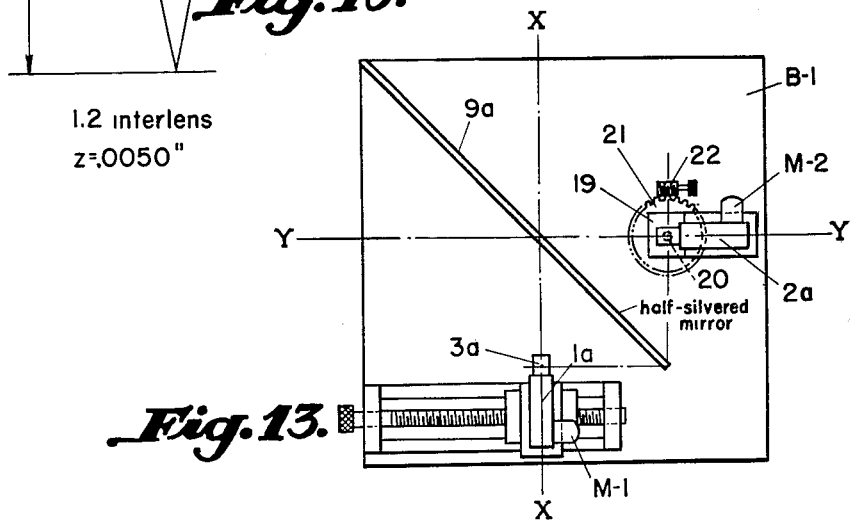
Fig. 13 is a plan view of a modified arrangement of apparatus for carrying out the invention.

Since the camera 2a is movable bodily about the pivot 20, it would be desirable with the arrangement of Fig. 13 to drive the films of both cameras 1a and 2a by means of small electrical motors M-1 and M-2 of the synchronous type that are customarily employed in various kinds of controls, so that the speeds of the two films will be identical.

From the foregoing, it is apparent that by the present invention, there is provided an improved apparatus for making photographic exposures on the films of moving picture cameras in such a manner that subsequent projection and viewing of the film images on a screen of given size, in association with suitable light polarizing devices, will result in the audience seeing all of the projected screen images with a three-dimensional effect consistent with the scene, or action, being shown, and with the subject portrayed in each pair of superimposed screen images being always properly located with respect to the edge of the films. With the arrangement of apparatus shown in Figs. 1 and 13, it is possible to obtain any required interlens separation between the cameras 1 and 2, or the cameras 1a and 2a, in accordance with the above described accurate computation of such separation to meet the requirements of any particular scene, as well as to obtain any required location of the film images with respect to the edges of the films, in accordance with an exact computation of the degree to which the mirror 9, or the camera 2a, shall be turned about its pivotal axis.

I claim:

1. Apparatus for making photographic exposures on the films of different motion picture cameras comprising in combination, a base for supporting said cameras with their lens axes at right angles to each other, a mirror having the property of passing and reflecting light mounted on said base so as to normally bisect the angle between said optical axes, means for shifting one camera on the base with respect to the other so as to obtain a predetermined separation between said lens axes when making simultaneous exposures on the camera films by the passage and reflection of light rays by said mirror, and means for swinging said mirror about a pivotal axis located between said cameras for properly locating the images photographed on one camera film by reflected light rays, with respect to the edge of said film.

2. Apparatus for making photographic exposures on the films of different motion picture cameras comprising in combination, a base for supporting said cameras with their lens axes at right angles to each other, a mirror having the property of passing and reflecting light mounted on said base so as to normally bisect the angle between said optical axes, means for shifting one camera on the base with respect to the other camera, which is fixed, so as to obtain a predetermined separation between said lens axes when making simultaneous exposures on the camera films by the passage and reflection of light rays by said mirror, means for turning said mirror about a pivotal axis located between said cameras, and means for indicating the degree of such mirror movement as computed for any predetermined interlens separation, in order to properly locate the images of the subject being photographed by reflected rays from said mirror on the film of the fixed camera, with respect to the edge of said film.

3. Apparatus for making photographic exposures comprising in combination, a pair of motion picture cameras mounted with their lens axes at right angles to each other, an element capable of passing and reflecting light mounted so as to normally bisect the angle between said lens axes, means for bodily shifting one camera and its lens with respect to the other camera and its lens, so as to obtain a predetermined effective separation between said lens axes, ranging from zero upwardly, when making simultaneous exposures on the camera films by the passage and reflection of light rays by said element, and means for varying the angular relation between said element and the lens axis of the camera which receives reflected light rays for properly locating the images photographed on this camera's film by such reflected light rays, with respect to the edge of said film.

4. Apparatus for making photographic exposures comprising in combination, a pair of motion picture cameras mounted with their lens axes at right angles to each other, an element capable of passing and reflecting light mounted so as to normally bisect the angle between said optical axes, means for bodily shifting one camera and its lens with respect to the other camera and its lens, so as to obtain a predetermined effective separation between said lens axes, ranging from zero upwardly, when making simultaneous exposures on the camera films by the passage and reflection of light rays by said element, means for swinging said element, in a plane, about a pivotal axis located between said cameras and outside of that portion of said element which passes and reflects light, and means for indicating the degree of such pivotal movement of the element, as computed for any predetermined interlens separation, in order to properly locate the images of the subject being photographed by reflected rays from said element with respect to the edge of the film which receives such images.

FLOYD A. RAMSDELL.

REFERENCES CITED

The following references are of record in the file of this patent:

UNITED STATES PATENTS

| Number | Name | Date |
|---|---|---|
| 1,595,984 | Ames, Jr. | Aug. 17, 1926 |
| 1,596,835 | Hewson | Aug. 17, 1926 |
| 2,153,892 | Jackman | Apr. 11, 1939 |
| 2,463,311 | Ramsdell | Mar. 1, 1949 |

FOREIGN PATENTS

| Number | Country | Date |
|---|---|---|
| 873 | Great Britain | of 1915 |
| 178,344 | Great Britain | Apr. 20, 1922 |
| 459,039 | Germany | Apr. 25, 1928 |
| 598,288 | Germany | June 8, 1934 |